Oct. 22, 1968    A. E. LEHRER ET AL    3,407,349
INVERTER CIRCUIT

Filed Dec. 26, 1961    2 Sheets-Sheet 1

INVENTORS
ALVIN E. LEHRER
CLINTON C. REMUZZI JR.
BY
ATTORNEY

Oct. 22, 1968

A. E. LEHRER ET AL 3,407,349

INVERTER CIRCUIT

Filed Dec. 26, 1961

2 Sheets-Sheet 2

INVENTORS
ALVIN E. LEHRER
CLINTON C. REMUZZI JR.

BY

ATTORNEY

United States Patent Office 3,407,349
Patented Oct. 22, 1968

3,407,349
INVERTER CIRCUIT
Alvin E. Lehrer, Deer Park, and Clinton C. Remuzzi, Jr., Port Washington, N.Y., assignors to Sperry Rand Corporation, Great Neck, N.Y., a corporation of Delaware
Filed Dec. 26, 1961, Ser. No. 161,884
7 Claims. (Cl. 321—45)

The invention herein described was made in the course of or under a contract or subcontract thereunder, with the Department of the Navy.

This invention relates to inverter circuits of the type used to convert D.C. electrical energy into A.C. electrical energy, and more particularly to an improvement in parallel inverters.

Parallel inverter circuits are well known in the art. Such circuits characteristically employ a pair of controlled rectifiers and a commutating capacitor to switch a source of direct current energy alternately between the two halves of a center-tapped output transformer winding.

Prior art circuits however, have proven to be impractical for applications in which a high degree of reliability is required. The conventional method of triggering these circuits does not provide reliable starting. Furthermore, prior art circuits are adversely influenced by transient overloads which frequently cause double firing of the rectifiers and so disable the inverter. Methods have been suggested for overcoming this latter difficulty, but such methods involve the use of cumbersome components that frequently cannot be accommodated in airborne or other mobile applications.

It is therefore an object of the present invention to provide an inverter with reliable starting characteristics.

It is a further object of the invention to provide an inverter that is substantially immune to adverse effects from transient overloads.

These and other objects will become more readily apparent from the following description when read in connection with the accompanying drawings.

According to the principles of the present invention, the improved reliability is achieved through ensuring adequate charge on the commutating capacitor by delaying the switching function beyond the normal charging time of the capacitor and by preventing the leakage of the accumulated capacitor charge into the load.

Figure 1:
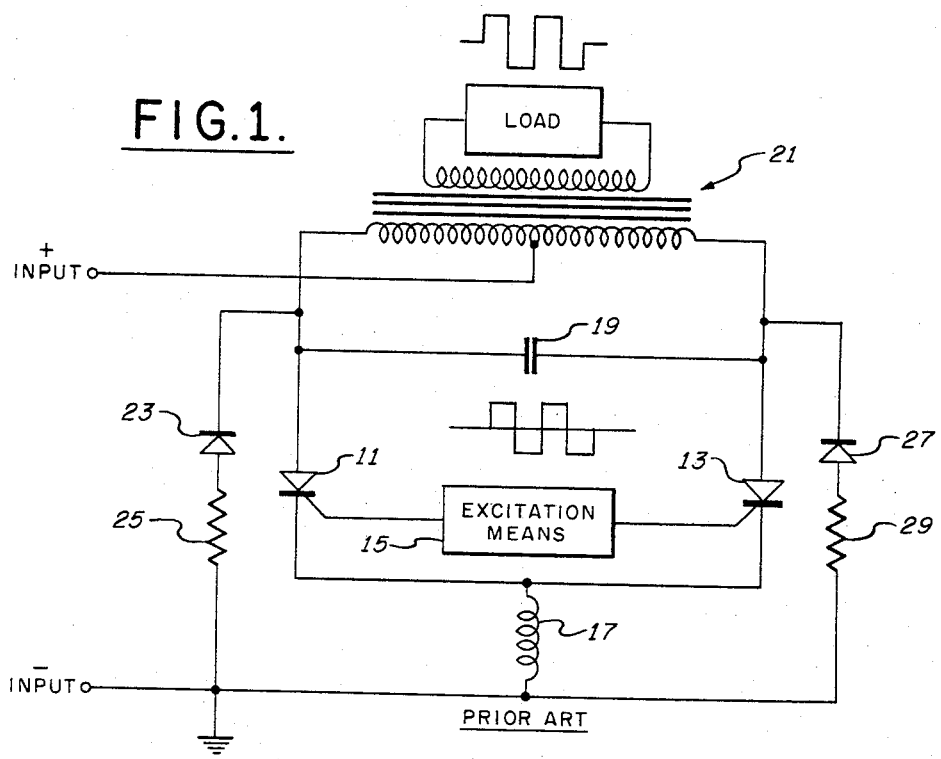
Figure 6:
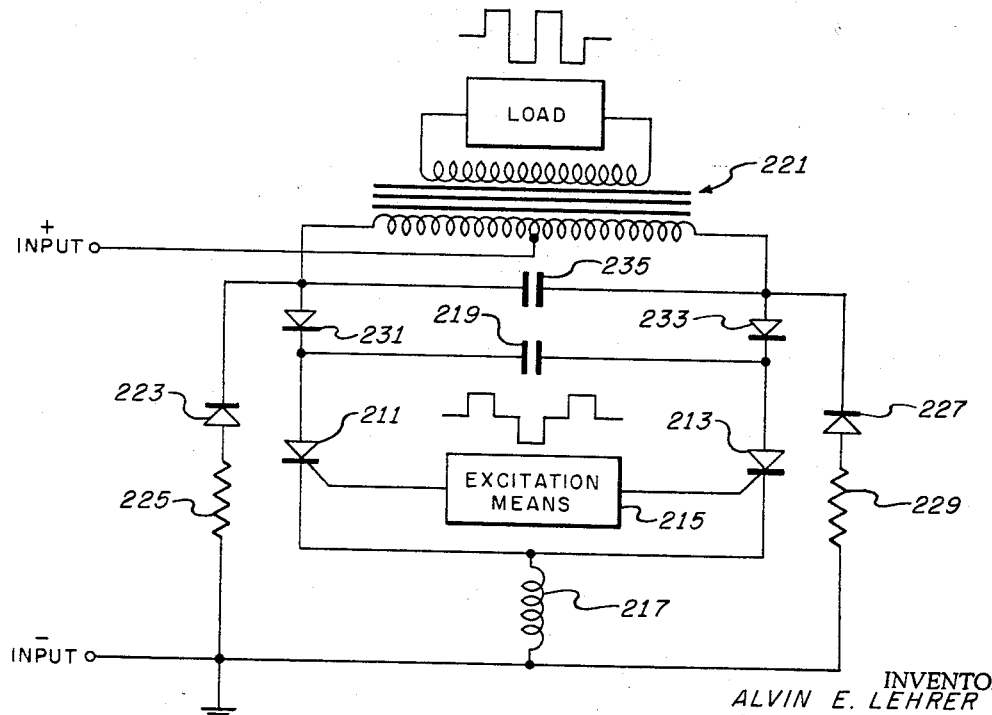
Figures 2, 4:
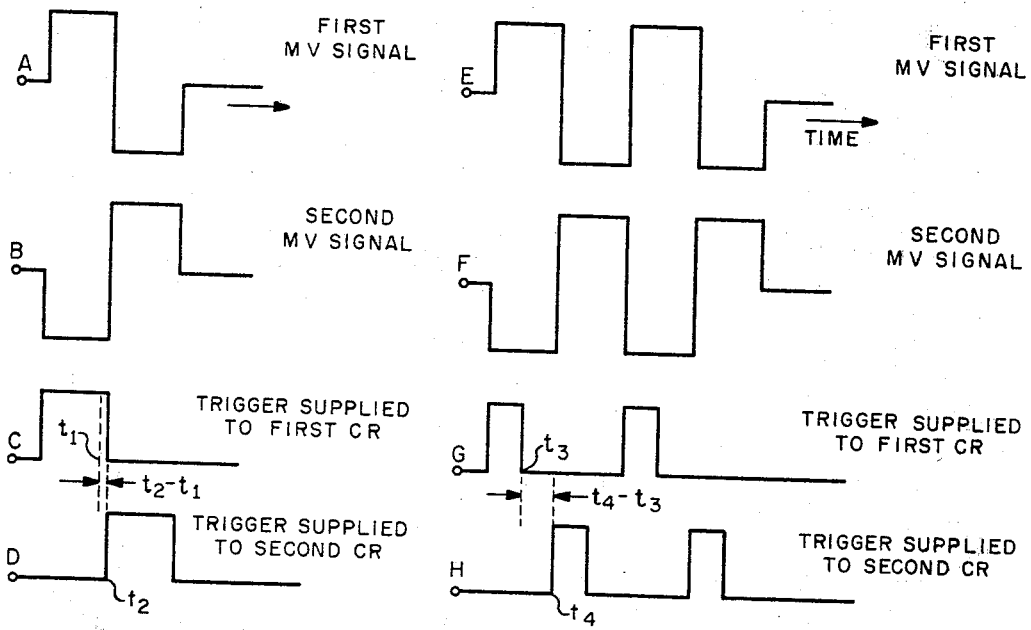
Figure 3:
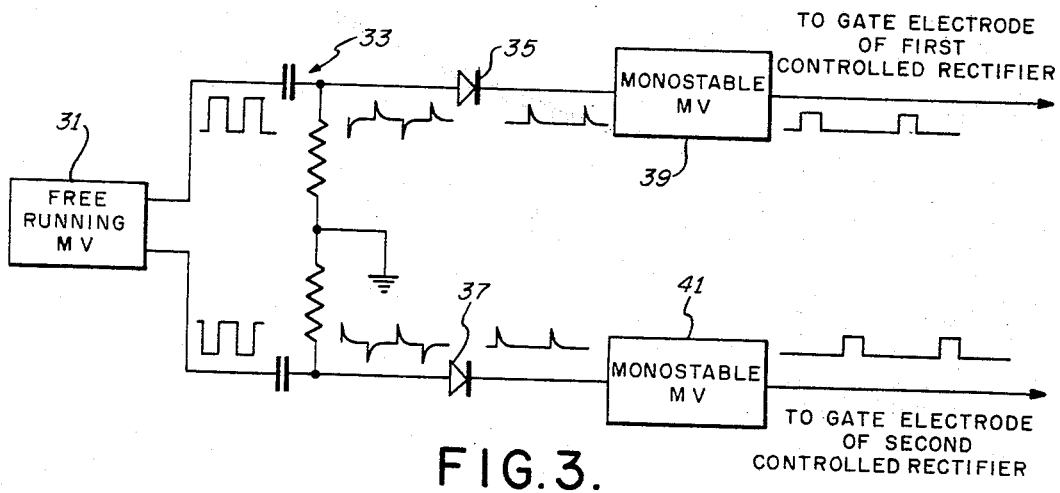
Figure 5:
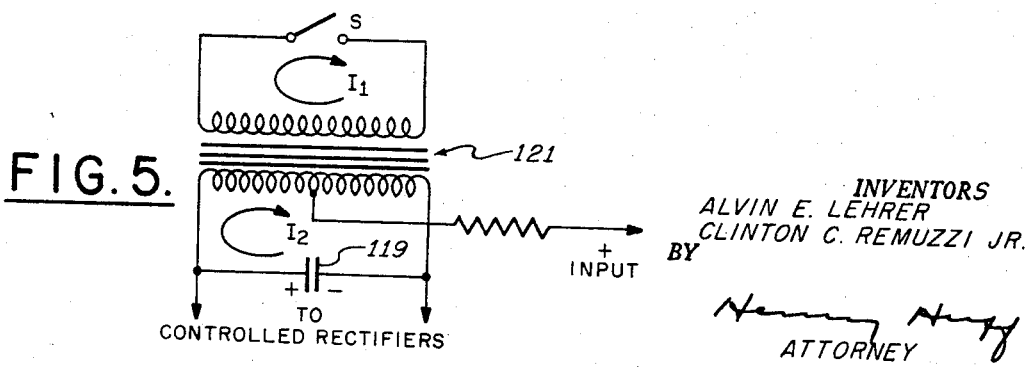

FIG. 1 is a schematic diagram of a prior art circuit illustrating the basic principle of operation of this class of device, FIG. 2 is a diagram illustrating the wave shape of voltages frequently employed to excite prior art circuits, FIG. 3 is a diagram, partially in block form, illustrating an excitation means that may be used in practicing the present invention, FIG. 4 is a diagram illustrating a preferred wave shape of voltage used in the present invention, FIG. 5 is a schematic diagram useful in describing the effect of transient overloads on prior art circuits, and FIG. 6 is a schematic diagram of an inverter employing the principles of the present invention.

Referring now to FIG. 1, one type of conventional parallel inverter comprises first and second controlled rectifiers 11 and 13. Solid state silicon controlled rectifiers are presently preferred for these elements although gaseous controlled rectifiers have been used in similar circuits. Such controlled rectifiers are turned on or "fired" by means of a pulse applied to a gate electrode. To turn off or "extinguish" the rectifier, it is necessary to reverse the main supply voltage or reduce it substantially to zero since the gate electrode loses control once the main current has begun to flow through the rectifier.

An excitation means 15 provides trigger pulses alternately to the gate electrodes of the two controlled rectifiers. The cathodes of the controlled rectifiers are connected together and to the negative input terminal through an inductive coupling means 17. A commutating capacitor 19 is connected between the anodes of the controlled rectifiers 11 and 13. The anodes of the controlled rectifiers are connected to opposite ends of the center-tapped primary winding of an output transformer 21, and the positive input terminal is connected to the center tap of the same winding. A feed-back diode 23 is connected from the anode of the controlled rectifier 11 to ground through a resistor 25 and a second feed-back diode 27 is connected from the anode of controlled rectifier 13 to ground through a resistor 29.

To better understand the operation of this circuit, assume that at some instant a controlled rectifier 11 is conducting. The voltage drop across the controlled rectifier during conduction is low. Similarly, the voltage drop across the inductor 17 during steady state conditions is low. Thus, one end of the primary winding of transformer 21 is practically at ground potential under these conditions. The current flowing through the half of the transformer winding connected to controlled rectifier 11 induces a voltage in the opposite half of this winding so that the total voltage across the entire winding approaches twice the line voltage. The commutating capacitor 19 will thus charge to approximately twice the input line voltage.

If a trigger pulse is now applied to the nonconducting rectifier 13 it will turn on. The voltage drop across this rectifier becomes negligible so that the commutating capacitor is effectively shunted across the controlled rectifier 11. The polarity of the charge on the capacitor is such that it reverses the anode to cathode voltage on the rectifier 11 and causes it to turn off. Current flow then takes place through the half of the primary winding connected to the rectifier 13. This current flow continues until a subsequent trigger pulse is applied to the rectifier 11. The process is repeated throughout the operating period of the inverter.

The feed-back diodes 23 and 27 improve the operation of the inverter by permitting reactive circulating currents to return to the power supply during the portion of the cycle when the conducting rectifier is subjected to a reverse voltage.

Conventional parallel inverters have employed excitation means providing various wave shapes of trigger voltage.

Excitation means which produce trigger voltages in the form of short pulses have not proven satisfactory. Shortly after one of the controlled rectifiers is turned on, it is subjected to a reverse transient as a result of the sudden decrease in current flow though the other controlled rectifier. Consequently, a positive trigger must exist at the end of the transient to assure conduction for the remainder of the half cycle. For this reason, an excitation means providing a square wave of voltage is often used to trigger the controlled rectifiers. Square wave triggering, however, leads to serious starting difficulties.

Reference to FIG. 2 and the following description will aid in understanding the reason for these difficulties.

Starting transients are produced by excitation means when these elements are first turned on. If the main voltage has been already applied to the controlled rectifiers, these starting transients can cause misfiring of the controlled rectifiers. Consequently, it is customary to energize the excitation means before the main voltage is applied. This expedient, however, leads to another source of trouble.

Excitation means conventionally comprise multivibrators producing appropriate square wave voltage signals. Two square waves, 180° out-of-phase with each other, are available from these multivibrators as indicated in curves A and B of FIG. 2. One of these signals is supplied to each controlled rectifier, so that the positive portion of the signal may cause the rectifier to turn on at appropriate times.

Assume that the main power is applied at time $t_1$ as indicated in curve C and that the positive pulse turns on the first controlled rectifier. The commutating capacitor begins to acquire a charge through the conducting rectifier. At time $t_2$ the excitation means supplies a positive trigger pulse to the second controlled rectifier which turns on this element. If the time interval $t_2-t_1$ happens to be insufficient to permit the commutating capacitor to charge to the voltage necessary to turn off the first controlled rectifier, both rectifiers will be in the conducting state, a heavy input current will be drawn, and inverter action cannot begin.

The present invention overcomes this difficulty by using an excitation means that provides a definite time interval between triggering signals. A circuit capable of providing an appropriate signal is depicted in FIG. 3 in which a conventional free-running multivibrator 31 supplies two out-of-phase square wave signals to a pair of resistance-capacitance differentiating circuits 33. The spike output signals from these circuits is rectified by the diode rectifiers 35 and 37. The resulting spikes correspond to the positive-going portions of the respective multivibrator signals. The outputs of the rectifiers are used to trigger conventional monostable or "one-shot" multivibrators. These multivibrators function as pulse stretchers so as to provide trains of pulses of sufficient duration to trigger the control rectifiers, but separated by definite interpulse time intervals.

Although the circuit of FIG. 3 is capable of providing appropriate signals for turning the control rectifiers on and off, it is to be realized that this circuit is given for purpose of illustration only. Many other varieties of circuits could be employed without departing from the spirit of the invention.

FIG. 4 illustrates the operation of the improved triggering cycle. Curves E and F represent the two signals obtained from the free-running multivibrator 31. Curves G and H illustrate the derived signals supplied to the gates of the respective controlled rectifiers. The pulses are made of sufficient duration to ensure reliable triggering of the individual controlled rectifiers. The interpulse time interval, $t_4-t_3$, is made sufficiently long so that the commutating capacitor can charge from substantially zero voltage to the turn-off voltage in this interval.

Thus, during the starting operation, if the first controlled rectifier is turned on at all, it will continue to conduct all during the interpulse time interval. Since the commutating capacitor can be fully charged during the interpulse time interval alone, sufficient turn-off voltage is ensured regardless of the time that the main voltage was applied. The first controlled rectifier will be turned off when the second rectifier is turned on at time $t_4$. In a specific circuit embodying the principles of this invention, a pulse repetition rate of 400 cycles per second is employed. A pulse duration equal to one third of the trigger cycle with interpulse time intervals equal to one sixth of the cycle are used. It is to be realized that variations of the wave shape indicated in FIGS. 3 and 4 may be used. Thus, excitation means producing a single train of stepped square waves can be employed. These waves consist of alternate positive and negative rectangular pulses of voltage separated by an interpulse time interval in which the voltage is substantially zero. The positive pulses are applied to the first controlled rectifier whereas the negative pulses are inverted and applied to the second controlled rectifier. Means capable of producing such stepped square waves are described in Patent 2,987,665, issued to E. E. Thompson on June 6, 1961.

The use of trigger voltages of appropriate wave shape thus provides reliable starting characteristics as well as reliable running characteristics under normal load conditions.

If, however, a transient overload occurs, such an inverter is subject to double firing which disables the inverter. Low power factor loads, or the sudden application of a heavy load can result in such transient overloads.

FIG. 5, which represents a portion of the circuit depicted in FIG. 1, illustrates the reason for this phenomenon. Commutating capacitor 119 is connected across the primary winding of the output transformer 121. Conductors from the commutating capacitor also lead to the controlled rectifiers. If a short circuit occurs as represented by the closure of the switch S, the sudden heavy current drain is supplied largely from the charge on the commutating capacitor. The capacitor, having lost charge, is unable to provide sufficient reverse voltage necessary to turn off the controlled rectifier at the time of the next switching function. The second rectifier is turned on at this time, however, so that both rectifiers conduct simultaneously and the inversion process stops. A similar phenomenon is experienced with low power factor loads. In this case a heavy circulating current drain can occur shortly before the switching is to take place. This current drain can discharge the capacitor to such an extent that it cannot turn off the appropriate controlled rectifier at the next switching period and the inversion process stops.

In order to provide reliable performance, the inverter therefore must be made insensitive to transient overloads. The present invention achieves this objective by preventing current drain from the capacitor to the output transformer.

FIG. 6 depicts the circuit of FIG. 1 modified according to the principles of the present invention. The controlled rectifiers 211 and 213 are supplied with a trigger voltage from the excitation means 215 and coupled to the negative input terminal through the coupling means 217. A commutating capacitor 219 interconnects the anodes of the controlled rectifiers. The center-tapped primary winding of transformer 221 is connected to the anodes of the controlled rectifiers through the transient suppressor diodes 231 and 233. These diodes are connected in the circuit to permit current flow from the transformer winding to the commutating capacitor 219, but to block current flow from the capacitor to the transformer winding. These diodes do not interfere with the current flow occurring during normal operation of the inverter since this flow is always from the winding to the respective controlled rectifiers. Transient overloads which discharge the commutating capacitor, however, tend to cause a current flow from the capacitor. By blocking the undesired current flow, the diodes 231 and 233 function as charge retaining means and cooperate to maintain the proper charge on the commutating capacitor despite such transients. A filter capacitor 235 may be connected across the primary winding if desired, to restore the filtering which is lost by isolating the commutating capacitor from the primary winding.

The feedback diodes 223 and 227 may be connected between the respective ends of the transformer winding and the negative input terminal through the associated resistors 225 and 229. The feedback diodes perform as in the prior art circuit to return circulating currents to the supply.

Although the principles of the present invention have been described in relation to a specific prior art circuit, it will be appreciated that other varieties of conventional parallel inverter circuits employing commutating capacitors to turn off the controlled rectifiers can also be improved by the application of these principles.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. A parallel inverter comprising a pair of controlled rectifiers, an output transformer coupled to receive energy from said rectifiers, a commutating capacitor connected between said rectifiers, an excitation means constructed and arranged to supply single rectangular trigger pulses to alternate rectifiers, said excitation means being adjusted to provide time intervals between pulses greater than the charging time of the capacitor, and transient suppressor means interposed between the capacitor and transformer to prevent loss of capacitor charge to the transformer.

2. An inverter circuit comprising a pair of controlled rectifiers, an output transformer coupled to receive energy through said rectifiers, an excitation means to turn on these rectifiers alternately, and a commutating capacitor connected between said rectifiers to turn either of these rectifiers off as the other is turned on, said excitation means including a source of rectangular pulses, first and second output terminals connected to the gate electrodes of the first and second of said pair of controlled rectifiers respectively, and means to energize alternate terminals with successive pulses, said source being adjusted to provide interpulse time intervals exceeding the time for the commutating capacitor to charge to full turn-off voltage, and transient suppressor diodes interposed between the terminals of the capacitor and said transformer so that the capacitor charge cannot flow to the transformer.

3. An inverter circuit comprising a first and a second controlled rectifier, each having an anode, a cathode and a gate electrode, a commutating capacitor connected between the anodes of said controlled rectifiers, first and second transient suppressor diodes each having an anode and a cathode, the cathodes of said first and second suppressor diodes being connected to the anodes of said first and second controlled rectifiers respectively, an output transformer having a center-tapped primary winding and a secondary winding, the anodes of said suppressor diodes being connected to each other through the primary winding, a filter capacitor connected across said primary winding, conducting means interconnecting the cathodes of said controlled rectifiers, a negative input terminal, coupling means connecting the cathodes of said controlled rectifiers to the negative input terminal, a positive input terminal connected to the center-tap of said output transformer, and excitation means connected to the gate electrodes of said first and second controlled rectifiers, said excitation means including a source of rectangular pulses, said source being adjusted to provide a time interval between successive pulses that exceeds the time necessary to charge the commutating capacitor from zero to the turn-off voltage of the controlled rectifiers.

4. An inverter circuit comprising:
(a) a first and a second controlled rectifier,
(b) a commutating capacitor having one of its terminals connected to the anode of the first controlled rectifier and its other terminal connected to the anode of the second controlled rectifier,
(c) first and second transient suppressor diodes, said first and second transient suppressor diodes having their cathodes connected to the anodes of the first and second controlled rectifiers respectively,
(d) an output transformer having a center-tapped primary winding, said output transformer further having opposite ends of its primary winding connected to the anodes of the first and second suppressor diodes respectively,
(e) a common coupling means coupling the cathodes of both controlled rectifiers to a negative input terminal,
(f) an excitation means connected to the gate electrode of each controlled rectifier,
(g) a source of rectangular pulses in said excitation means, said source being adjusted to provide a time interval between successive pulses that exceeds the charging time of the commutating capacitor.

5. An inverter circuit comprising:
(a) a first and a second controlled rectifier,
(b) a commutating capacitor having one of its terminals connected to the anode of the first controlled rectifier and its other terminal connected to the anode of the second controlled rectifier,
(c) first and second transient suppressor diodes, said first and second transient suppressor diodes having their cathodes connected to the anodes of the first and second controlled rectifiers respectively,
(d) an output transformer having a center-tapped primary winding, said output transformer further having opposite ends of its primary winding connected to the anodes of the first and second suppressor diodes respectively,
(e) a common coupling means coupling the cathodes of both controlled rectifiers to a negative input terminal,
(f) exciting means connected to the gate electrode of each controlled rectifier, said means including a source of two oppositely-phased square waves, differentiating circuits connected to receive each square wave signal, rectifiers connected to pass the positive pulses from each differentiating circuit, a pair of monostable multivibrators connected to receive triggering pulses from each rectifier, and conducting means connecting each multivibrator to the gate electrode of an individual controlled rectifier, said pair of multivibrators being adjusted to provide a time interval between successive pulses exceeding the charging time of the commutating capacitor.

6. A parallel inverter comprising a pair of controlled rectifiers, an output transformer coupled to receive energy from said rectifiers, a commutating capacitor connected between said rectifiers, an excitation means constructed and arranged to supply single trigger pulses to alternate rectifiers, said excitation means being adjusted to provide time intervals between pulses greater than the charging time of the capacitor, and transient suppressor diodes interposed between the terminals of the capacitor and said transformer so that the capacitor charge cannot flow to the transformer.

7. In combination, first and second terminals adapted for connection across a voltage source, a transformer having a primary winding with first and second connection points spaced apart thereon and a third connection point between them, and connected at said third point to said first terminal, first silicon controlled rectifier means and first diode rectifier means having a first junction between them and connected in series between said first connection point and said second terminal, second silicon controlled rectifier means and second diode rectifier means having a second junction between them and connected in series between said second connection point and said second terminal, and capacitor means connected between said first and second junctions.

References Cited

UNITED STATES PATENTS

| | | | |
|---|---|---|---|
| 2,809,303 | 10/1957 | Collins | 307—88 |
| 3,080,534 | 3/1963 | Paynter | 331—113.1 |
| 3,085,190 | 4/1963 | Kearns et al. | 321—45 |
| 3,075,136 | 1/1963 | Jones | 321—45 |

OTHER REFERENCES

Automatic Control Magazine, November, 1960, "Applying a 50-Ampere Controlled Rectifier" pp. 23–26, D. A. Pisarcik.

General Electric Controlled Rectifier Manual, 1960, pp. 126–140, TK 2798 G4g.

LEE T. HIX, *Primary Examiner.*

W. M. SHOOP, JR., *Assistant Examiner.*